Dec. 8, 1964 A. MONOMAKHOFF 3,160,877
HIGH-PITCHED HORN
Filed Nov. 24, 1961
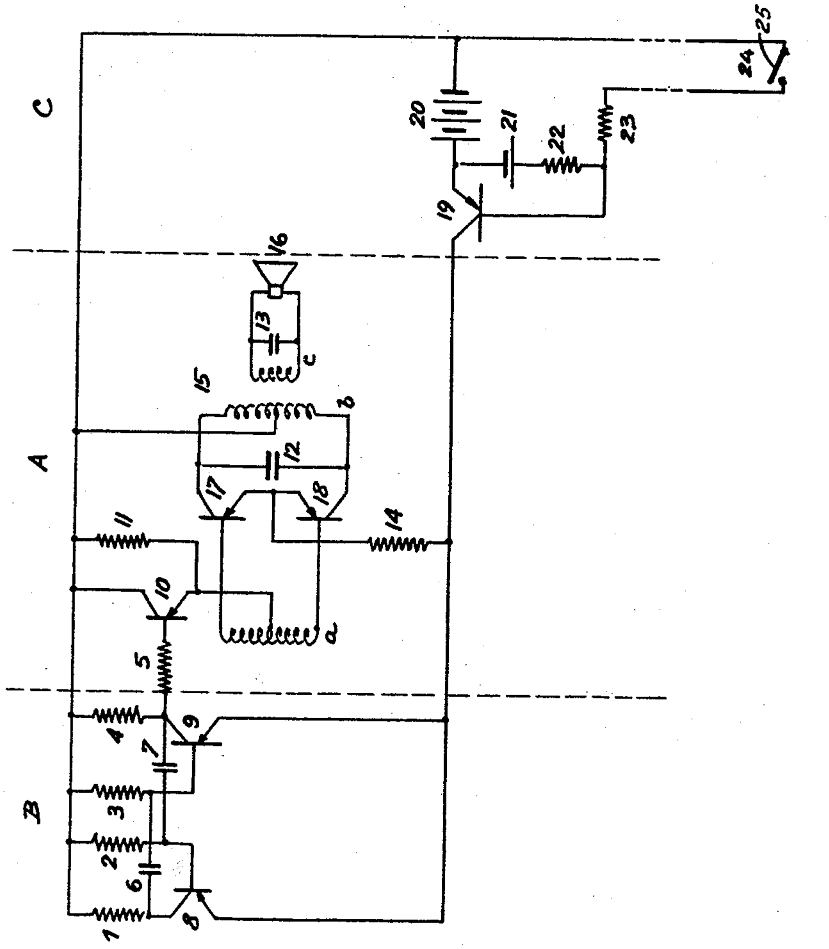
Inventor:
Alexandre Monomakhoff
By Karl W. Flocks
Attorney United States Patent Office 3,160,877

Patented Dec. 8, 1964

3,160,877
HIGH-PITCHED HORN

Alexandre Monomakhoff, Verneuil-en-Halatte, Oise, France, assignor to Charbonnages de France, Paris, France, a public institution of France Filed Nov. 24, 1961, Ser. No. 154,617
Claims priority, application France, Nov. 29, 1960, 845,375
5 Claims. (Cl. 340—384)

The object of the present invention is a high-pitched horn, the sound characteristics of which are such that the emitted signal can be heard and distinguished in the most noisy surroundings, with the object of issuing calls or giving an alarm. This device can operate with a very small source of power and offers the further advantage that it can be constructed so as to be intrinsically safe.

Horns are already known which emit a sound simultaneously modulated in amplitude and frequency.

Devices are also known which emit a warbling sound by interposing a multivibrator between two oscillators of different frequencies, the multivibrator cutting-off alternately the supply of each oscillator.

The present invention relates to a high-pitched horn which emits a sound modulated simultaneously in amplitude and frequency, comprising a single low-frequency oscillator supplying a non-aperiodic sound transducer, a multivibrator modifying periodically the operation of the said oscillator, and a resistance element producing a frequency swing accompanied by a periodic modulation of the amplitude.

The resistance element is arranged in the emitter of a transistor which effects the coupling between the multivibrator and the oscillator.

In accordance with a feature of the invention, the oscillator and the multivibrator are constructed by means of semi-conductor units.

According to an advantageous feature, the means frequency of the low-frequency oscillator is tuned to the natural resonance frequency of the non-aperiodic sound transducer.

In accordance with a further particular feature, the control of the operation of the high-pitched horn by a high impedance circuit is obtained by means of a transistor switch.

Other advantages and particular features will become apparent from the description which follows below by way of example, with reference to the accompanying drawings, in which the single figure shows the circuit diagram of a transistorized intrinsically safe high pitched horn with a self-contained supply according to the invention.

The apparatus is essentially composed of an oscillator A, the operating point of which is periodically varied by the action of a multivibrator B. The signal obtained is applied to a sound transducer constituted, in the example shown, by the association, known per se, of a telephone capsule and a horn by which it is coupled to the surrounding atmosphere. The multivibrator is composed of transistors 8 and 9. The resistances 1 and 4 form the collector load circuits, the resistances 2 and 3 supply the base circuits. The relaxation coupling is effected by means of the condensers 6 and 7.

The oscillator is constituted by a symmetrical self-oscillating circuit of the two transistors 17 and 18. By its winding *a*, the transformer 15 provides the reaction necessary for maintaining oscillations; the winding *b* constitutes the load of the transistors, and the winding *c* transmits the signal to the sound receiver with the best impedance matching.

The resistance 14 provides the circuit with a certain thermal stability by providing a reverse-reaction current effect which is known per se.

The condensers 12 and 13 adjust the means frequency of the apparatus so that it coincides with the resonance frequency of the capsule. In this way, an optimum efficiency of the apparatus is obtained.

The coupling between the multivibrator and the oscillator is effected by the transistor 10, the control current of which is regulated by the resistance 5.

The resistance 11 prevents the operation of the oscillator being chopped by the multivibrator, but on the other hand it causes a periodic frequency swing accompanied by amplitude modulation.

The control of the oscillation can be effected by means of a switch mounted directly in the supply circuit of the apparatus.

In the case of control by a line of great length, the resistance of which can attain a non-negligible value, it is advantageous to employ a device such as shown at C in the drawing. The device C is composed of a transistor switch 19 in series with a source 20. An additional battery 21 and a resistance 22 ensure reliable blocking of the transistor in the absence of a control signal, even in the event of an increase in temperature.

The control is then effected by a high-impedance circuit terminating in the resistance 23 connected to the base of the transistor switch.

The operation of the device is then as follows:

In order to issue a call or give an alarm with the device, it is only necessary to supply the unit comprising the oscillator and the multivibrator from the source of current 20. If the control has been effected in accordance with the circuit C, this supply is obtained by short-circuiting the two conductors of the line 24, through a switch 25, or any type of monitoring device which has the effect of unblocking the transistor 19.

There is then obtained a sound which is simultaneously modulated in frequency and in amplitude. This very characteristic sound can be distinguished in the most noisy surroundings.

It will furthermore be observed that the electrical characteristics of the device enable to obtain an intrinsically-safe circuit, permitting the use of the said device in atmosphere in which there is risk of fire or explosion. It has the additional advantage that it can be controlled from a distance with reliability, even if the control line has a normally or accidentally high impedance.

In particular, if intrinsic safety is not required, the device can conveniently be fed from an external source of current such as from a rectified secondary of a mains transformer which could be substituted in the circuit for battery source 20.

It will be obvious to those skilled in the art that various changes may be made without departing from the scope of the invention and therefore the invention is not limited to what is shown in the drawings and described in the specification but only as indicated in the appended claims.

What I claim:

1. A high-pitched horn emitting a sound which is simultaneously modulated in amplitude and in frequency comprising a non-aperiodic sound transducer, a single low-frequency oscillator supplying energy to said transducer, a multivibrator operatively connected to said oscillator whereby the operation of said oscillator is modified by the operation of said multivibrator, a transistor coupling said oscillator to said multivibrator and having a base, a collector, and an emitter, a resistance element connected to said emitter and to a common circuit connection with said collector whereby a frequency swing accompanied by periodic amplitude modulation is produced at said transducer, and a direct current supply connected in the circuitry.

2. A high-pitched horn emitting a sound which is simultaneously modulated in amplitude and in frequency comprising a non-aperiodic sound transducer, a single low-frequency oscillator having semiconductor elements supplying energy to said transducer, a multivibrator operatively connected to said oscillator whereby the operation of said oscillator is modified by the operation of said multivibrator, a transistor coupling said oscillator to said multivibrator and having a base, a collector, and an emitter, a resistance element connected to said emitter and to a common circuit connection with said collector whereby a frequency swing accompanied by periodic amplitude modulation is produced at said transducer, and a direct current supply connected in the circuitry.

3. A high-pitched horn emitting a sound which is simultaneously modulated in amplitude and in frequency comprising a non-aperiodic sound transducer, a single low-frequency oscillator having semi-conductor elements and having its mean frequency adjusted to a frequency of resonance of said transducer and supply energy to said transducer, a mutivibrator having semi-conductor elements and operatively connected to said oscillator whereby the operation of said oscillator is modified by the operation of said multibrator, a transistor coupling said oscillator to said multivibrator and having a base, a collector, and an emitter, a resistance element connected to said emitter and to a common circuit connection with said collector whereby a frequency swing accompanied by periodic amplitude modulation is produced at said transducer, and a direct current supply connected in the circuitry.

4. A high-pitched horn emitting a sound which is simultaneously modulated in amplitude and in frequency comprising a non-aperiodic sound transducer, a single low-frequency oscillator having semiconductor elements supplying energy to said transducer, a multivibrator having semi-conductor elements and operatively connected to said oscillator whereby the operation of said oscillator is modified by the operation of said multivibrator, a transistor coupling said oscillator to said multivibrator and having a base, a collector, and an emitter, a resistance element connected to said emitter and to a common circuit connection with said collector whereby a frequency swing accompanied by periodic amplitude modulation is produced at said transducer, a direct current supply connected in the circuitry, a transistor switch operatively connected to said direct current supply, and a high impedance circuit operating in conjunction with said transistor switch and closing the circuitry of the horn.

5. A high-pitched horn emitting a sound which is simultaneously modulated in amplitude and in frequency comprising a non-aperiodic sound transducer, a single low-frequency oscillator having semiconductor elements and having its means frequency adjusted to a frequency of resonance of said transducer and supply energy to said transducer, a multivibrator having semi-conductor elements and operatively connected to said oscillator whereby the operation of said oscillator is modified by the operation of said multivibrator, a transistor coupling said oscillator to said multivibrator and having a base, a collector, and an emitter, a resistance element connected to said emitter and to a common circuit connection with said collector whereby a frequency swing accompanied by periodic amplitude modulation is produced at said transducer, a direct current supply connected in the circuitry, a transistor switch operatively connected to said direct current supply, and a high impedance circuit operating in conjunction with said transistor switch and closing the circuitry of the horn.

References Cited by the Examiner

UNITED STATES PATENTS

| | | | |
|---|---|---|---|
| 2,910,688 | 10/39 | Kelley et al. | 340—384 |
| 2,455,472 | 12/48 | Curl et al. | 340—384X |
| 2,826,691 | 3/58 | Elliott | 331—47 |
| 2,926,347 | 2/60 | Thiele | 340—384 |

NEIL C. READ, *Primary Examiner.*

BENNETT G. MILLER, *Examiner.*